US009291181B2

(12) United States Patent
Speller

(10) Patent No.: US 9,291,181 B2
(45) Date of Patent: Mar. 22, 2016

(54) FASTENING ARRANGEMENT FOR PLATE-SHAPED FACING COMPONENTS, FACING ARRANGEMENT AND AIRCRAFT OR SPACECRAFT

(71) Applicant: AIRBUS OPERATIONS GMBH, Hamburg (DE)

(72) Inventor: John Speller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/262,228

(22) Filed: Apr. 25, 2014

(65) Prior Publication Data

US 2014/0321947 A1    Oct. 30, 2014

Related U.S. Application Data

(63) Continuation of application No. PCT/EP2012/070671, filed on Oct. 18, 2012.

(60) Provisional application No. 61/552,727, filed on Oct. 28, 2011.

(30) Foreign Application Priority Data

Oct. 28, 2011    (DE) .......................... 10 2011 085 396

(51) Int. Cl.
*F16B 5/00*    (2006.01)
*B64C 1/40*    (2006.01)
(Continued)

(52) U.S. Cl.
CPC ................ *F16B 5/0084* (2013.01); *B64C 1/00* (2013.01); *B64C 1/066* (2013.01); *B64C 1/403* (2013.01); *Y02T 50/46* (2013.01)

(58) Field of Classification Search
USPC .................................. 403/292, 231, 252, 255
See application file for complete search history.

(56) References Cited

U.S. PATENT DOCUMENTS 3,396,678 A * 8/1968 Jensen ...................... 248/346.02
5,076,035 A * 12/1991 Wright ............................ 52/464
(Continued)

FOREIGN PATENT DOCUMENTS

EP    1468907         10/2004
EP    1 996 458 B1    8/2009
(Continued)

OTHER PUBLICATIONS

International Search Report for Application No. PCT/EP 2012/070671 dated Feb. 1, 2013.
(Continued)

*Primary Examiner* — Victor MacArthur
(74) *Attorney, Agent, or Firm* — Jenkins, Wilson, Taylor & Hunt, P.A.

(57) ABSTRACT

The present disclosure relates to a fastening arrangement for plate-shaped facing components. The fastening arrangement includes at least one profiled rail comprising legs in a cross-section, an intermediate space being formed between these legs and configured to hold a peripheral portion of at least one of the facing components. A first one of the legs of the profiled rail includes at least one opening which extends into the first leg in a transverse direction of the profiled rail. The fastening arrangement also includes at least one fixing element which is equipped with at least one extension. The extension is designed such that it can be pressed into the opening in the first leg to fix the facing component so that the extension protrudes into the intermediate space and portions thereof come into frictional contact with the peripheral portion of the facing component held in the intermediate space.

19 Claims, 5 Drawing Sheets

(51) Int. Cl.
*B64C 1/06* (2006.01)
*B64C 1/00* (2006.01)

(56) References Cited

U.S. PATENT DOCUMENTS

| | | | |
|---|---|---|---|
| 6,712,316 B2 * | 3/2004 | Jones | 244/132 |
| 8,375,670 B2 | 2/2013 | Hysky | |
| 8,910,925 B2 * | 12/2014 | Payne | 256/25 |
| 2008/0156934 A1 * | 7/2008 | Guard et al. | 244/119 |
| 2009/0321701 A1 * | 12/2009 | Payne | 256/57 |

FOREIGN PATENT DOCUMENTS

| | | |
|---|---|---|
| EP | 2311722 | 4/2011 |
| FR | 1192068 | 10/1959 |
| WO | WO 2009/080641 | 7/2009 |
| WO | WO 2013/060615 | 5/2013 |

OTHER PUBLICATIONS

German Office Action for Application No. 10 2011 085 396.0 dated Oct. 23, 2015.

* cited by examiner

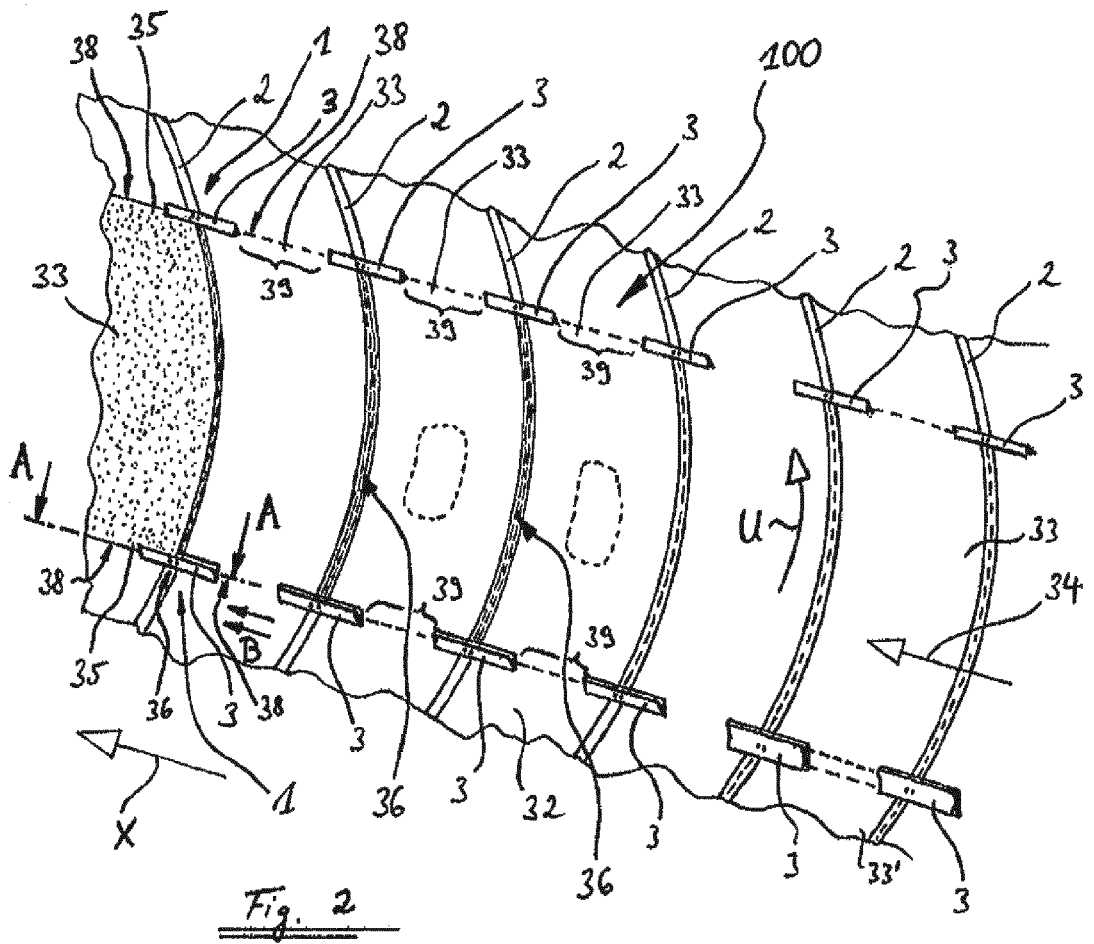
Fig. 2
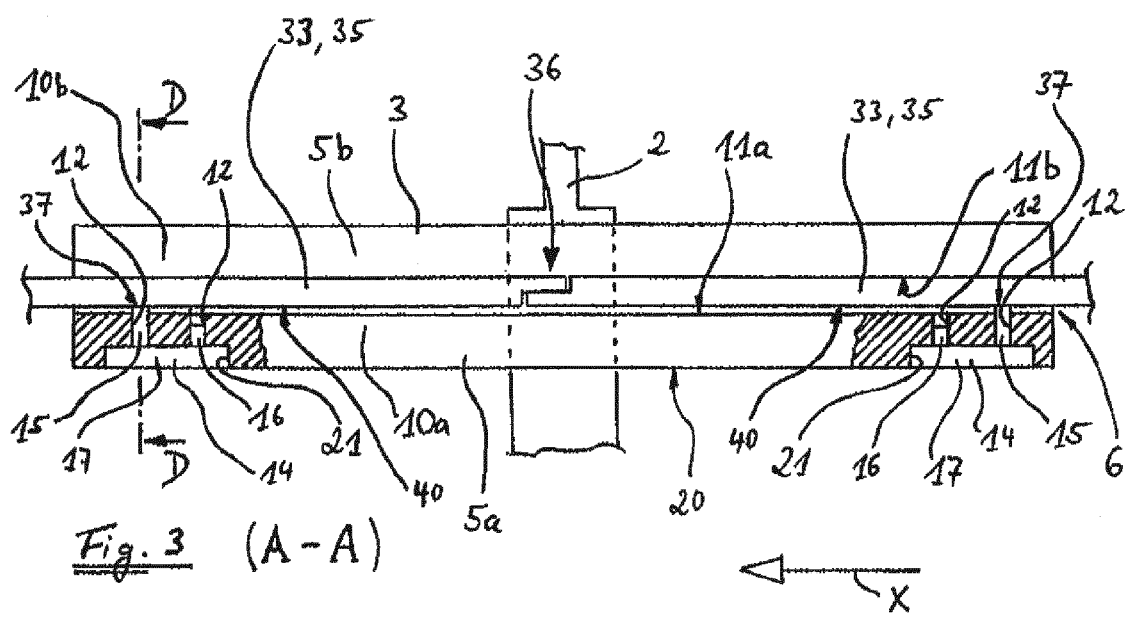
Fig. 3 (A-A)

(B)

(C) - (D-D)

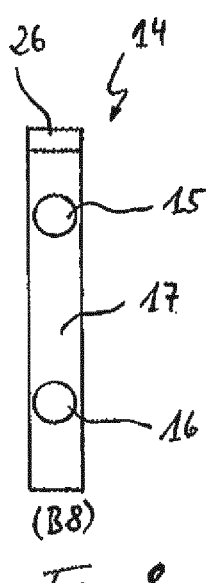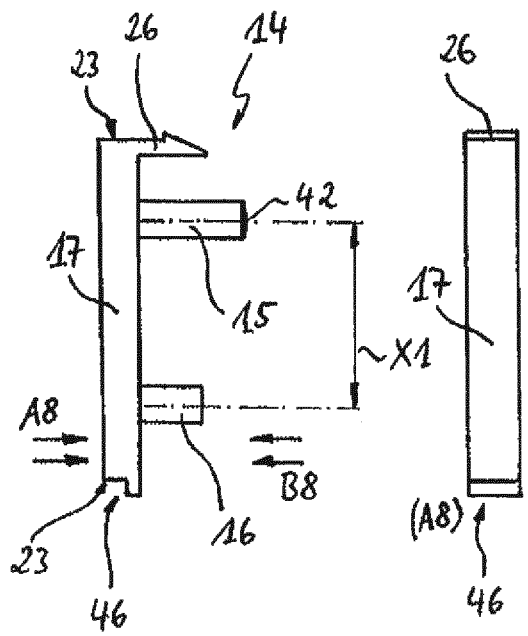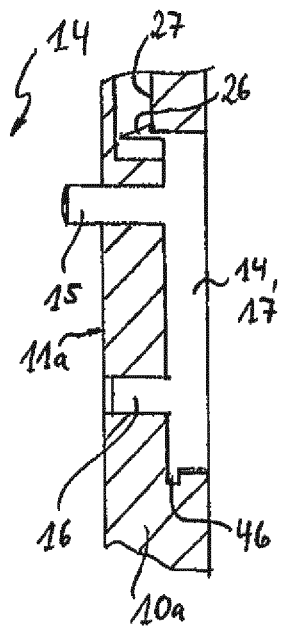
Fig. 8
Fig. 8A
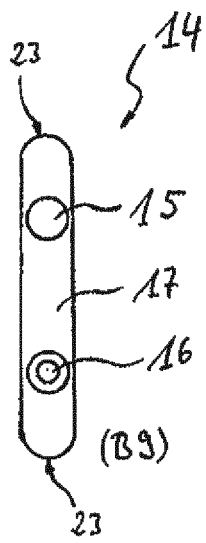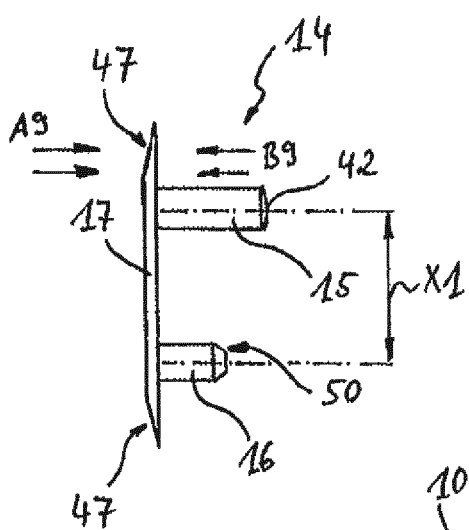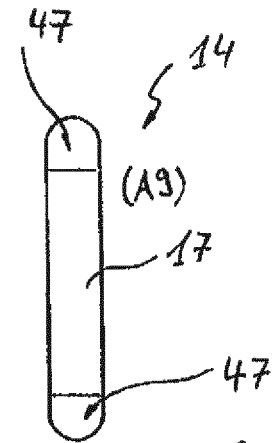
Fig. 9
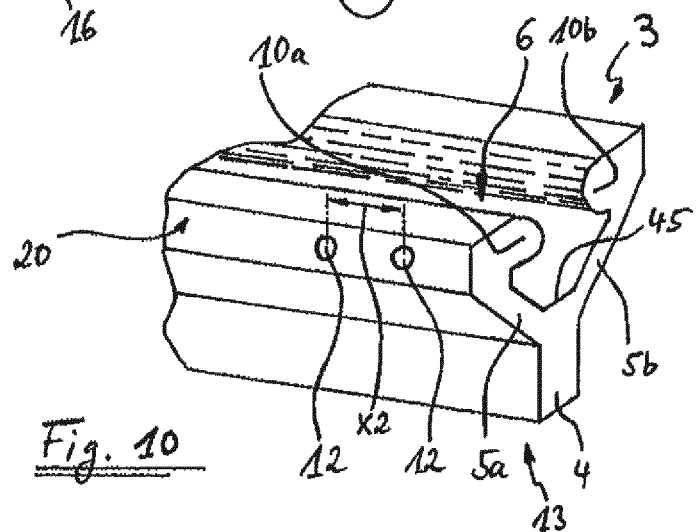
Fig. 10

FASTENING ARRANGEMENT FOR PLATE-SHAPED FACING COMPONENTS, FACING ARRANGEMENT AND AIRCRAFT OR SPACECRAFT

CROSS-REFERENCE TO RELATED APPLICATIONS

This application is a continuation of and claims priority to International Patent Application No. PCT/EP2012/070671, filed Oct. 18, 2012, which claims the benefit of and priority to U.S. Provisional Application No. 61/552,727, filed Oct. 28, 2011 and German Patent Application No. 10 2011 085 396.0, filed Oct. 28, 2011, the entire disclosures of which are herein incorporated by reference.

TECHNICAL FIELD

The invention relates to a fastening arrangement for plate-shaped facing components, a facing arrangement and an aircraft or spacecraft, especially an aircraft, which comprises such a facing arrangement.

BACKGROUND

Although in principle the invention can be used for fastening a wide range of facing components, the invention and the underlying problem are described in greater detail below using the example of fastening a plate-shaped facing component for the inner facing of a modern passenger aircraft. This facing component may, for example, be a side wall element of the inner facing of the aircraft cabin.

Side wall elements of the inner facing of the cabin (also known as side wall panels or window panels) are amongst the last components to be assembled when fitting out the inside of a passenger aircraft before the passenger seats are installed. As the inner facing of the cabin may be exposed to vibrations and impact-type loads during flight, it should be reliably fastened to structural components of the aircraft.

WO 2009/080641 A1 describes a plug-in mounting bracket for detachably mounting an inner facing on a fuselage, for example. The plug-in mounting bracket comprises a connector to be fitted on the sub-structure and a holder which can be installed on a part of the facing. The connector is provided with a retaining pin which comprises a recess which can be engaged with a spring-biased slide mechanism in the holder. A pivotally mounted cam lever is provided to unlock the plug-in mounting bracket.

However, such a mounting bracket for inner facing components for aircraft has a complex design and is complicated to manufacture, making it expensive. This needs to be improved.

SUMMARY

One idea of the invention is to design a system for fastening plate-shaped facing components, and in particular for fastening inner facing components in aircraft, in a less complex and more cost-effective fashion. It should still be possible to install facing components in a simple and time-efficient manner.

A fastening arrangement for plate-shaped facing components is accordingly provided which comprises at least one profiled rail and at least one fixing element. The profiled rail comprises legs in a cross-section, an intermediate space being formed between these legs and configured to hold a peripheral portion of at least one of the facing components. A first one of these legs comprises at least one opening which extends into the first leg in a transverse direction of the profiled rail. The fixing element is used to fix the facing component and comprises at least one extension which is designed such that it can be pressed into the opening in the first leg so that the extension protrudes into the intermediate space and portions thereof come into frictional contact with the peripheral portion of the facing component which is held in the intermediate space.

A facing arrangement is also provided which comprises two or more plate-shaped facing components and at least one such fastening arrangement. The plate-shaped facing components are arranged such that they lie next to one another at at least one joint to form a facing in an aircraft or spacecraft. The profiled rail of the fastening arrangement is fastened to a structural component of the aircraft or spacecraft. Peripheral portions of two adjacent facing components are held in the intermediate space of the profiled rail of the fastening arrangement in the region of the joint. In this context, at least one of the held peripheral portions is fixed by friction in the intermediate space of the profiled rail by means of the fixing element of the fastening arrangement to prevent it from slipping.

An aircraft or spacecraft, especially an aircraft, which comprises such a facing arrangement is also proposed according to the invention.

The concept behind the present disclosure is therefore to fasten the plate-shaped facing component to a structural component of an aircraft or spacecraft by holding the peripheral portion between the legs of the profiled rail. By using the fastening arrangement according to the invention, the facing components can advantageously be installed particularly simply by pushing the peripheral portion of the facing component into the intermediate space of the profiled rail. In this context, it is advantageous if the position of the facing component along the profiled rail is initially not yet definitively fixed. This makes it possible to adjust or adapt the position of the facing component to the actual position of an adjacent facing component which is already installed. Once the plate-shaped facing component has reached its desired position along the profiled rail, it can be fixed in precisely the position it has reached by means of the fixing element. It is thus not necessary to securely attach retaining devices to the plate-shaped facing component or to incorporate recesses into the facing component and to consider the position of these retaining devices or recesses during installation. The extension of the fixing element can come into frictional contact with the facing component at any point on the held peripheral portion by protruding into the intermediate space, and thus prevent the facing component from slipping in the profiled rail. The invention thus permits simple, time-efficient and precise installation of the plate-shaped facing components. It is a simple matter to compensate for dimensional tolerances and position the facing components as a result of the invention.

The fastening arrangement according to the invention can also be produced in a cost-effective manner at the same time. For example, it is possible to manufacture the profiled rail very simply by cutting to length from a continuous length or bulk stock and subsequently forming the at least one opening. It is no longer necessary to use complicated and expensive machinery with movable parts.

Advantageous embodiments, developments and improvements of the invention are described in the additional subordinate claims and in the description with reference to the drawings.

In an embodiment of the invention, the profiled rail is designed such that the profiled rail can be fastened to the structural component. The profiled rail may in this case comprise fastening devices, for example fastening openings, for suitable fastening means such as screws, rivets or fixing pins.

In another embodiment the first leg comprises at least two adjacent openings. In this case the fixing element comprises at least two extensions. The adjacent openings and the extensions are designed and arranged such that at least one of the extensions of the fixing element protrudes into the intermediate space after the extensions have been pressed into the adjacent openings in the first leg. By providing two extensions which can be pressed into the two adjacent openings in the first leg, it is possible to prevent the fixing element from twisting with respect to the profiled rail in its installed state, in that it fixes the plate-shaped facing component by friction.

According to a further embodiment of the invention, the adjacent openings in the first leg and the extensions of the fixing element are designed and arranged such that the extensions are jammed by friction in the openings when they are pressed into the openings and such that the fixing element is fixed on the first leg as a result. This makes it possible to prevent the fixing element from becoming detached of its own accord after pressing in to fix the plate-shaped facing component in position and thus losing frictional contact between the extension and the peripheral portion of the facing component.

In another embodiment, a gap between the adjacent openings in the first leg and a gap between the extensions of the fixing element are different and this difference is sufficient to ensure that the extensions are jammed in position. When the extensions are pressed into the openings, this improvement in the invention makes it possible to prise apart or press together the extensions due to the different gaps and thus allows them to be jammed in the openings by friction even better and more effectively, which means that the fixing element is fixed even more reliably to the first leg.

In another embodiment of the invention, one of the two extensions of the fixing element is designed such that it does not protrude into the intermediate space after the extensions are pressed into the adjacent openings. As a result, only one of the two extensions comes into frictional contact with the peripheral portion of the facing component held in the intermediate space when pressed into the openings. One extension per fixing element, which is designed to come into frictional contact with the wall portion, may in many cases be sufficient to fix the facing component in the intermediate space. A force which brings about the frictional contact with the peripheral portion may be applied fully to the protruding extension in this case. The extension which does not protrude into the intermediate space is then merely used to fix the fixing element on the first leg by jamming in position and to prevent the fixing element from twisting with respect to this leg.

In another embodiment of the invention the adjacent openings of the first leg run substantially parallel to each other and the extensions extend substantially parallel to each other from a base portion of the fixing element. This makes it possible to press the extensions into the adjacent openings simply and simultaneously.

In a further embodiment, an end face of the extension, which protrudes into the intermediate space after pressing in and which can be brought into frictional contact with the peripheral portion of the plate-shaped facing component, is provided with a friction-enhancing material and/or with a friction-enhancing surface structure so as to increase the friction between the end face of the extension and the peripheral portion. In a sample embodiment, the friction-enhancing material may be designed as a suitable coating on the end face, for example as a rubber coating on the end face. The friction-enhancing surface structure which is provided alternatively or additionally may, for example, take the form of grooves on the end face. Alternatively a napped structure may be provided on the end face of the extension. An increase in friction between the extension and the peripheral portion of the facing component improves fixing of the facing component in the intermediate space of the profiled rail by friction to an even greater extent.

According to a further embodiment of the invention, a second one of the legs of the profiled rail is provided with a friction-enhancing material and/or with a friction-enhancing surface structure on a surface facing the first leg which points towards the intermediate space, so as to increase the friction between the surface of the second leg and the peripheral portion. The friction-enhancing material may, for example, be applied as a suitable coating, for example a rubber coating, on the surface of the second leg, or the surface may also or alternatively be provided with grooves or a napped effect to form the friction-enhancing surface structure. An improved frictional contact between the peripheral portion of the plate-shaped facing component and the second leg of the profiled rail is also achieved in this embodiment. This makes it possible to fix the facing component even more reliably in the intermediate space.

In one embodiment the extension or extensions is/are designed as a substantially cylindrical pin or as substantially cylindrical pins. The opening or openings in the first leg is/are also or alternatively designed to be substantially cylindrical in this embodiment. A fixing element with cylindrical extensions can be manufactured relatively simply. In addition, cylindrical openings can be incorporated into the first leg very simply by drilling, for example. The fastening arrangement according to the present invention can be produced even more cost-effectively as a result.

In a further embodiment, the fixing element comprises an engagement element and/or a locking element. The fixing element can be fixed on the profiled rail by a positive connection by means of the engagement element and/or the locking element after pressing the extension or the extensions into the opening or openings in the first leg by engaging the engagement element and/or locking the locking element into a notch or undercut in the profiled rail. This makes it possible to fix the plate-shaped facing component even more reliably in the intermediate space by means of the frictional locking between the extension and the peripheral portion by preventing the fixing element from moving out of position, for example in the event of vibrations or impact-type loads, thanks to the positive connection between the profiled rail and the fixing element.

In accordance with one development, the cross-section of the profiled rail may be designed to be Y-shaped with an intermediate space which is open on one longitudinal side of the profiled rail. Alternatively, the cross-section of the profiled rail may be designed to be double-Y-shaped with two intermediate spaces which are open on two different longitudinal sides of the profiled rail.

According to one embodiment, the profiled rail and the fixing element are formed from a suitable plastics material. In this way a fastening arrangement with minimal weight can be achieved, which can also be produced cost-effectively. However, in an alternative embodiment, for applications with particularly high loads, the profiled rail could also be formed from a metal material.

In a variant, the profiled rail may be designed as an extruded profile. In this case the openings can, for example, be incorporated into the first leg retrospectively by machining, for example by drilling or milling. If a second leg provided with a friction-enhancing coated surface is provided, a friction-enhancing layer may, for example, be applied by co-extruding on the second leg.

According to an embodiment of the facing arrangement according to the invention, at least two fixing elements are provided for each profiled rail of the fastening arrangement. In this case the peripheral portions of the two adjacent facing components held in the intermediate space are each fixed in the intermediate space by friction by one of the two fixing elements to prevent slipping. This means that the two adjacent facing components can be reliably fastened by means of the fastening arrangement.

In a further embodiment of the facing arrangement, a fastening arrangement with at least two profiled rails is provided in the region of every joint between two facing components, the facing components being held at opposite edges of the facing components in the region of the joint by means of the two profiled rails. As a result, no further fastening means are required for the two facing components in the region of the joint.

The above embodiments and developments can be combined in any desired manner, within reason. Further possible embodiments, developments and uses of the invention also include combinations of features of the invention described previously or below with respect to the embodiments, even if not explicitly specified. In particular, persons skilled in the art will also add individual aspects as improvements or additions to the respective basic form of the present invention.

BRIEF DESCRIPTION OF THE DRAWINGS

The invention is explained below in greater detail with the aid of embodiments specified in the schematic figures of the drawings, in which:

FIG. 2 shows part of a cabin interior in a passenger aircraft and a facing arrangement with fastening arrangements according to the embodiments of the present invention;

FIG. 3 is a section A-A through a profiled rail of the facing arrangement illustrated in FIG. 2;

FIG. 8 shows a variant of the fixing element in FIG. 7;

FIG. 8A is a sectional view of a portion of a profiled rail with a recess suitable for the fixing element according to FIG. 8, and with a fixing element according to FIG. 8 in the installed state;

FIG. 9 shows a fixing element according to a further embodiment of the invention; and FIG. 10 shows an end portion of a profiled rail for a fastening arrangement in which the fixing element from FIG. 9 is used, in a perspective view from above.

Figure 1:
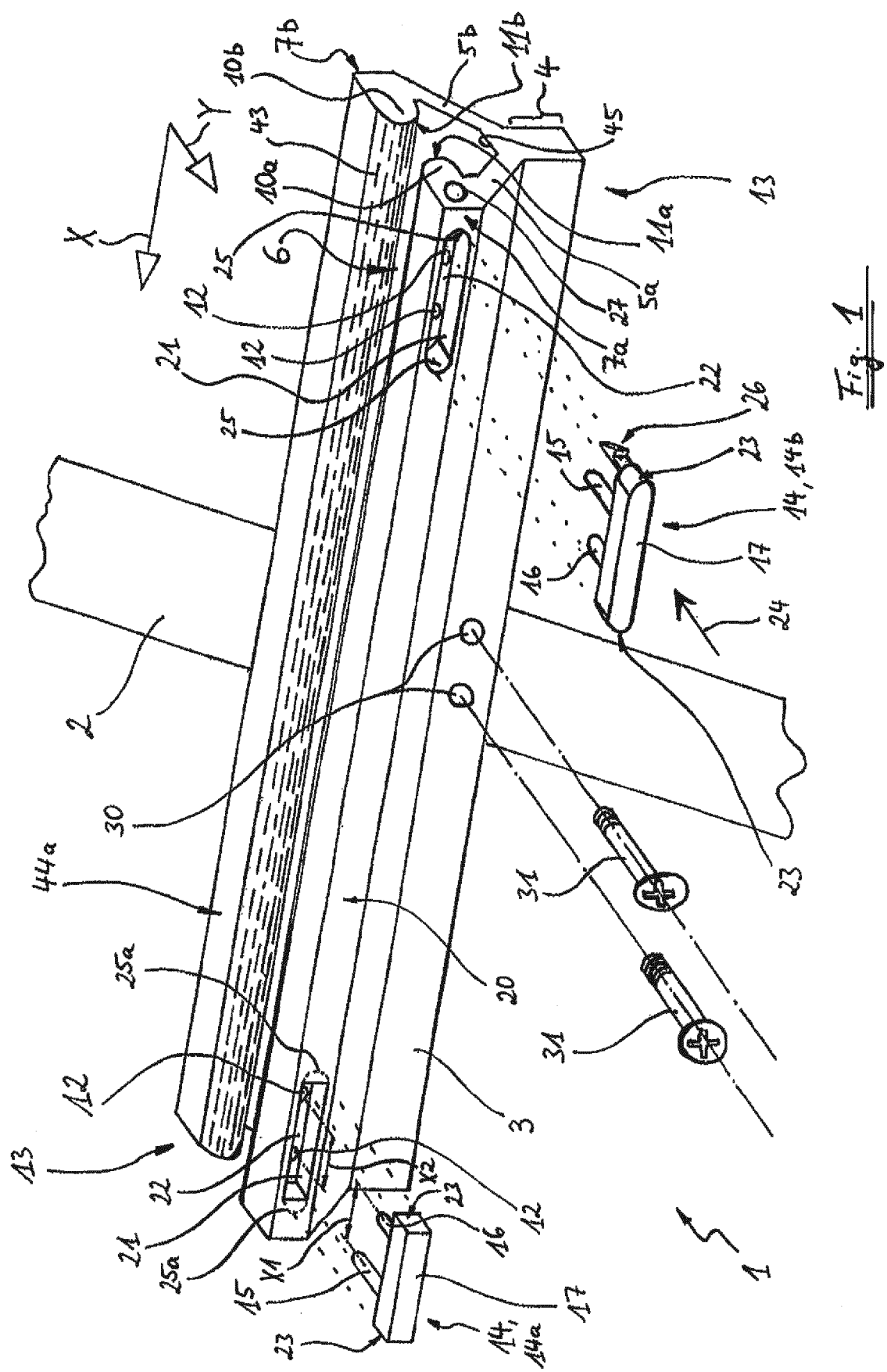
FIG. 1 shows a fastening arrangement for plate-shaped facing components with two differently designed fixing elements illustrating a first and second embodiment of the invention in a perspective view, one portion of a structural component also being portrayed in this case.

The appended drawings should convey further understanding of the embodiments of the invention. They illustrate embodiments of the invention and clarify the principles and concepts behind the invention in conjunction with the description. Other embodiments and many of the described advantages are apparent from the drawings. The elements of the drawings are not necessarily illustrated to scale.

In the figures of the drawings, the same elements or elements serving the same function and having the same effect are provided with the same reference numerals in each case—unless otherwise specified.

DETAILED DESCRIPTION

FIG. 1 shows a fastening arrangement 1 which is used to fasten plate-shaped facing components, which are not illustrated in FIG. 1 for the sake of clarity, to a structural component 2 of an aircraft or spacecraft, only a portion of this structural component being shown.

The plate-shaped facing components which can be fastened by means of the fastening arrangement 1 in FIG. 1 may, for example, be side wall elements of the inner facing of a cabin in a modern passenger aircraft. Such side wall elements are also known as "side wall panels" or "window panels". The structural component 2 illustrated in FIG. 1 may, for example, be a former which is used to stiffen the outer shell of a fuselage.

The fastening arrangement 1 in FIG. 1 comprises a profiled rail 3 which is designed to be substantially Y-shaped in cross-section. In this case, a first leg 5a and a second leg 5b preferably extend symmetrically outwards from a base region 4 of the profiled rail 3. An intermediate space 6 is formed between the legs 5a, 5b. The intermediate space 6 is designed to hold peripheral portions of two adjacent plate-shaped facing components, as explained in greater detail below.

In the example shown in FIG. 1, the legs 5a, 5b are designed to be thicker in the region of the end portions 7a and 7b and comprise regions 10a and 10b which protrude towards the intermediate space 6. The surfaces 11a and 11b of the legs 5a or 5b facing the intermediate space 6 are designed to be rounded.

A longitudinal direction of the profiled rail 3 is marked as X in FIG. 1, whilst a transverse direction of the profiled rail 3 is marked as Y. In one arrangement of the profiled rail 3 on the structural component 2, the longitudinal direction X runs substantially parallel to a longitudinal axis of the fuselage.

The first leg 5a is provided with two pairs of adjacent openings 12 which extend into the first leg 5a substantially along the transverse direction Y of the profiled rail 3.

As shown in FIG. 1, a pair of adjacent openings 12 is positioned next to each end 13 of the profiled rail 3. The openings 12 may be designed to be cylindrical and incorporated into the leg 5a by drilling, for example.

The fastening arrangement 1 as shown in FIG. 1 also comprises two fixing elements 14, the two fixing elements 14 illustrated in FIG. 1 being designed differently so as to illustrate two possible embodiments of the invention and also being provided with reference numerals 14a and 14b for the sake of clarity. However, the two fixing elements 14 assigned to a profiled rail 3 may be formed in the same way.

Each of the fixing elements 14a, 14b shown in FIG. 1 comprises two extensions 15 and 16. The two extensions 15, 16 of each of the fixing elements 14a, 14b extend substantially parallel to each other from a base portion 17 of the respective fixing element 14a, 14b. In addition, the two extensions 15 and 16 of each of the fixing elements 14a, 14b in FIG. 1 are designed to be cylindrical and pin-like and have a diameter which substantially corresponds to the diameter of the openings 12 or is slightly bigger than the diameter of the openings 12. The openings 12 may have substantially the same diameter and the extensions 15, 16 may also have substantially the same diameter.

The extensions 15 and 16 are arranged on the respective base portion 17, spaced apart and dimensioned with respect to the openings 12 such that the extensions 15 and 16 can be pressed into the two adjacent openings 12 at the respective end 13 of the profiled rail 3. As shown in FIG. 1, the first leg 5a of the profiled rail 3 may be equipped with longitudinal recesses 21 on an outer surface 20, these recesses extending into the first leg 5a to some extent, but not penetrating this leg completely. The recesses 21 are positioned such that adjacent openings 12 extend from a base 22 of the recess 21 through the remaining material of the protruding region 10a through the first leg 5a to the intermediate space 6.

In the embodiments illustrated in FIG. 1, the base portions 17 of the fixing elements 14a, 14b are formed differently. Whilst the fixing element 14a has a cuboid base portion 17 with flat side surfaces 23, side surfaces 23 of the fixing element 14b are designed to be rounded and preferably each take the shape of a semi-cylinder. The recess 21 assigned to the respective fixing element 14a or 14b may, as shown in FIG. 1, have a shape corresponding to the respective base portion 17. When the extensions 15 and 16 are pressed into the two adjacent openings 12 in the first leg 5a in the direction of the arrow 24, the base portion 17 is held in the associated recess 21. The base portions 17 and the recesses 21 are formed and dimensioned in an appropriate manner for this purpose. A depth of the recess 21 may correspond to a thickness of the base portion 17 of the associated fixing element 14, the respective fixing element 14 not protruding over the outer surface 20 of the first leg 5a after the extensions 15 and 16 have been completed pressed into the openings 12, but preferably being flush with this outer surface.

FIG. 1 shows that the recess 21 (which is assigned to the fixing element 14a in FIG. 1) may, for example, have a substantially rectangular cross-section. However, from a production engineering point of view, it may be possible to provide the recess 21 lengthwise with rounded, for example semi-cylindrical end surfaces 25. This is shown in FIG. 1 for the recess 21 associated with the fixing element 14b. A recess with end surfaces 25 which are rounded in this manner may, for example, be simply incorporated into the first leg 5a by milling. A recess 21 with end surfaces 25a which are rounded in the described manner could also be provided for the fixing element 14a, these end surfaces being indicated by the dashed line in FIG. 1. In this case, a space then remains between the side surfaces 23 of the base portion 17 of the fixing element 14a and the end surfaces 25a and this space can advantageously be used to release the fixing element 14a from the recess 21 after pressing in, for example with the aid of a screwdriver.

The recesses 21 in the profiled rail 3 may be formed in the same way for an application of the fastening arrangement 1, for example in an aircraft, corresponding to the identical embodiment of the fixing elements 14.

The extensions 15 and 16 of each of the fixing elements 14a, 14b illustrated in FIG. 1 are formed, dimensioned and spaced apart on the respective base portion 17 such that the extensions 15 and 16 are jammed by friction in the associated adjacent openings 12 when pressed into these openings. The respective fixing element 14a, 14b is fixed to the first leg 5a as a result. This is explained below in greater detail with reference to FIG. 3.

In order to secure the fixing element to the first leg 5a not merely by friction, but also by a positive connection, the fixing element may be provided with a locking element 26 as illustrated using the fixing element 14b for example. The locking element 26 is, for example, a tongue which may recoil elastically with a tapered end and a locking projection, this tongue being set apart from the base portion 17 in the same direction as the extensions 15 and 16. When the extensions 15 and 16 of the fixing element 14b are pressed into the associated openings 12, the locking projection of the locking element 26 engages behind an undercut, which is not visible in FIG. 1, of the profiled rail 3 in the region of the recess 21 assigned to the fixing element 14b. This undercut could, for example, be produced by forming a notch 27, and in particular a hole, in the first leg 5a of the profiled rail 3 along the longitudinal direction X and, if applicable, by making the base 22 deeper on a local basis. When the base portion 17 of the fixing element 14b is completely held in the associated recess 21 and ends flush with the outer surface 20, the fixing element 14b is then also fixed in a positive connection by means of the locking element 26 as well as the extensions 15 and 16 being jammed by friction in the openings 12. The positive connection can be released in the illustrated example by inserting a pointed tool into the notch 27 (also see FIG. 8A).

The profiled rail 3 is provided with fastening devices for holding appropriate fastening means in order to fasten the profiled rail 3 to the structural component 2. For example, the base region 4 of the profiled rail 3 may be provided with one or more fastening openings 30, as shown in FIG. 1. For example, two fastening openings 30 are illustrated in FIG. 1. The profiled rail 3 can be fastened to the structural component 2, for example a former, with the aid of fastening means 31 which may be formed by screws, rivets and/or fixing pins, for example, by using the fastening openings 30. A welded joint to fix the profiled rail 3 to the structural component 2 is also conceivable in a variant in which the embodiment of the profiled rail 3 is made from metal.

FIG. 2 is a view into the cabin interior of a commercial aircraft with a facing arrangement 100, structural components 2 which are designed as formers being illustrated schematically along with an outer shell 32 of the fuselage which is stiffened by means of the structural components 2. A number of plate-shaped facing components 33 ("side wall panels") are provided to line the structural components 2, the outer shell 32 and other components, cables, wires and insulation materials which are not illustrated in FIG. 2 and which may be arranged on the inside of the outer shell 32 and/or on the structural components 2, and FIG. 1 shows one of these in a dotted representation and others by means of a dashed outline. In order to fasten the plate-shaped facing components 33, profiled rails 3 are fastened to the structural components 2, from one structural component 2 to an adjacent structural component 2, for example, at the same height in each case as a floor of the cabin, with the aid of fastening means 31, as explained in relation to FIG. 1. In FIG. 2, the longitudinal directions X of the profiled rails 3 thus run substantially parallel to each other and parallel to a longitudinal direction of the fuselage.

In order to fasten the plate-shaped facing components 33, these are inserted into the profiled rails 3 in the direction of the arrow 34 substantially along the longitudinal direction X with their peripheral portions 35. When they are installed in their proposed position, consecutive adjacent plate-shaped facing components 33 abut against each other at joints 36 in this case. In the region of each joint 36, the peripheral portions 35 are held in the respective intermediate space 6 of an associated profiled rail 3 and the facing components 33 are held in this way on the structural components 2 by means of two opposite upper and lower edges 38.

The profiled rails 3 which are arranged at a constant height on adjacent structural components 2, formers in this case, do not form a continuous rail. Regions 39, in which the peripheral portions 35 run freely, still remain between the profiled rails 3. This thus saves weight when fastening the plate-shaped facing components 33 in the regions 39.

When installing the facing components 33, these may thus first be inserted into the profiled rails 3 in direction 34 and pushed into the desired position along direction X for alignment purposes, to compensate for any dimensional and fitting tolerances. Each of the plate-shaped facing components 33 is then secured in the desired position at the lower and optionally also at the upper edge 38 by means of the fixing elements 14 to prevent slipping or movement along direction X.

FIG. 3 shows one of the structural components 2, one of the profiled rails 3 and two plate-shaped facing components 33 adjacent to each other at a joint 36, along with two fixing elements 14 for fixing the facing components 33 in a cross-section A-A. The joint 36 is formed as a lap joint in the example shown in FIG. 3. Adjacent plate-shaped facing components 33 advantageously abut against each other at the joint 36 in the region of the middle of each profiled rail 3, viewed along the longitudinal direction X.

As illustrated in FIG. 3, the two extensions 15 and 16 of each of the fixing elements 14, which may, for example, be formed in the same way as the fixing element 14a or the fixing element 14b, in compliance with FIG. 1, are designed with different lengths. The extension 15 is longer than the extension 16. In FIG. 3, the extensions 15 and 16 are pressed into the openings 12 and are jammed in these openings as a result of friction. The base portion 17 of the fixing element 14 is held completely in the respective recess 21 in the first leg 5a and flush with the outer surface 20. In the illustrated state, the extension 15, which is longer than the extension 16, protrudes into the intermediate space 6. In this case, an end face 37 of the extension 15 exerts a compressive force on a first surface 40 of the peripheral portion 35 of one of the facing components 33 held in the respective region of the intermediate space 6. As a result, a second surface 41 of the respective peripheral portion 35 facing the first surface 40 is pressed against the surface 11b of the second leg 5b of the profiled rail 3. In this way, frictional contact is created between the peripheral portions 35, the profiled rail 3 and the extension 15 of the respective fixing element 14. The friction between these components prevents the plate-shaped facing components 33 from slipping along direction X.

Figure 4:
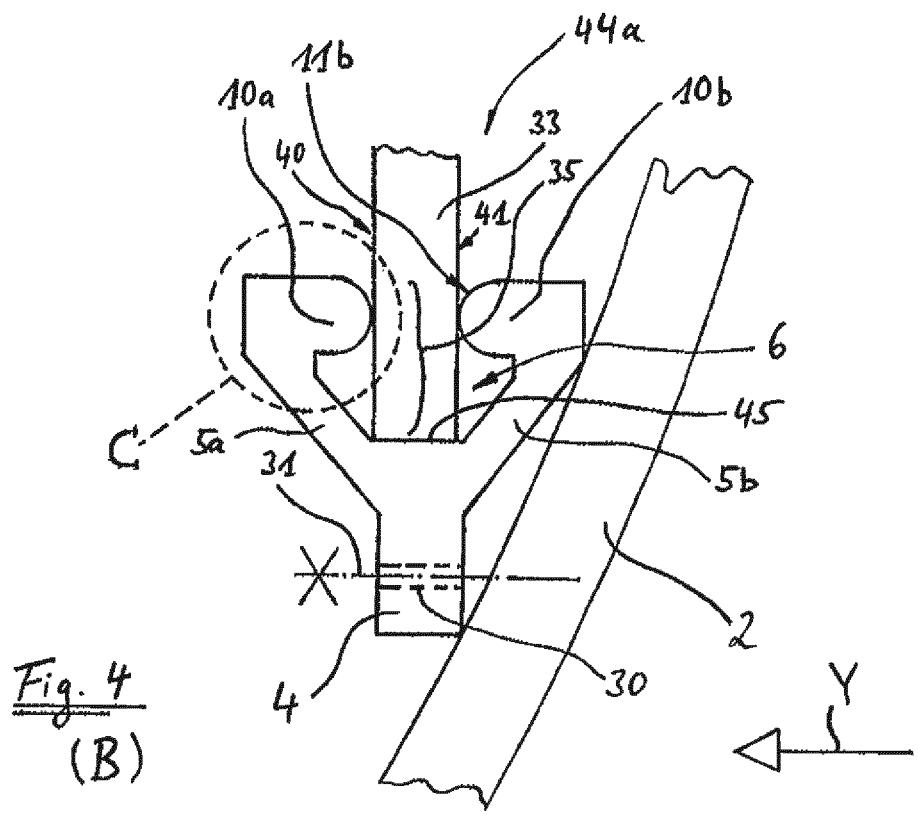
FIG. 4 is a view B of the profiled rail shown in section in FIG. 3 in the direction of its longitudinal axis, one peripheral portion of a plate-shaped facing component being held in an intermediate space of the profiled rail.
Figure 5:
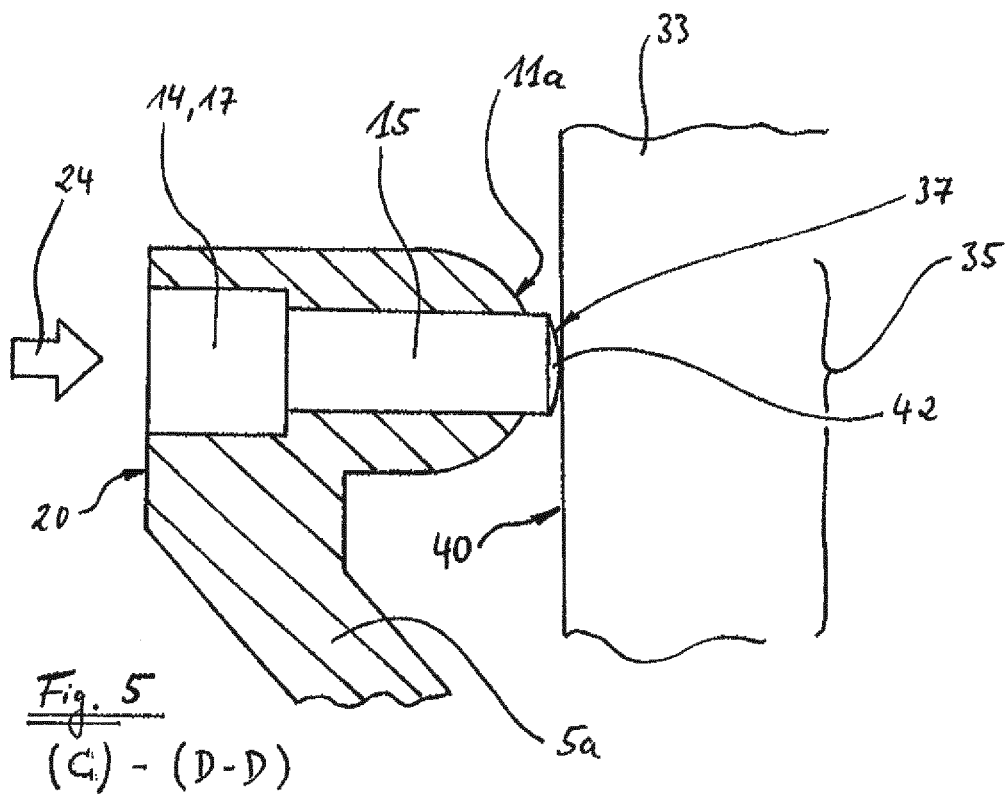
FIG. 5 is a detail C from FIG. 4 in the section D-D indicated in FIG. 3.

The profiled rail 3 holding the peripheral portion 35 of the facing component 33 is shown enlarged even further in FIG. 4, in View B as indicated in FIG. 2. A further enlargement of detail C in section D-D, as shown in FIG. 3, is shown in FIG. 5. FIG. 5 clearly shows how the extension 15 of the fixing element 14 protrudes into the intermediate space 6 and presses against the first surface 40 of the peripheral portion 35. This presses the second surface 41 of the peripheral portion 35 against the surface 11b of the second leg 5b; see FIG. 4.

In order to improve the frictional contact between the extension 15 and the first surface 40 and between the surface 11b and the second surface 41b and to increase friction between the surfaces, an end face 37 of the extension 15 may be provided with a friction-enhancing material. FIG. 5 shows that a friction-enhancing coating 42, for example using a rubber material, can be provided in the region of the end face 37 of the extension 15. Instead, a blank made from an elastic material could also be bonded to the free end of the extension 15 to form the end face 37.

The end face 37 can also, in addition or as an alternative to the coating 42, be provided with a friction-enhancing surface structure. The end face 37 may, for example, be grooved or napped. A combination of such a surface structure with the coating 42 is also conceivable.

In order to improve frictional contact even more, the second leg 5b may be also provided with a friction-enhancing material or with a friction-enhancing surface structure on the surface 11b facing the first leg 5a, which comes into frictional contact with the second surface 41 of the peripheral portion 35. Such a surface structure is indicated by reference numeral 43 in FIG. 1. A combination of a coating, which may in turn be designed as a rubber coating on the surface 11b for example, and a suitable surface structure, for example grooves or a napped surface, is also conceivable in the region of the surface 11b.

As shown in FIG. 3 once again, the extension 16 of each of the fixing elements 14 does not protrude into the intermediate space 6 in the illustrated example. The extensions 15 and 16 may be designed as cylindrical pins with a diameter which is slightly larger than the diameter of the associated openings 12. A gap X1 between the extensions 15 and 16 (see FIG. 1 and FIGS. 7-9) of each of the fixing elements 14, for example measured between their central axes, may also be slightly smaller than a gap X2 (FIGS. 1 and 10) between the centre lines of the cylindrical and substantially parallel openings 12, measured along the longitudinal axis X. The extensions 15 and 16 can thus be jammed even more firmly against each other in the openings 12. Fixing the fixing elements 14 on the first leg 5a by means of friction by jamming the extensions 15, 16 in the openings 12 means that the respective fixing element 14 is not pressed out of the leg 5a and the frictional contact between the extension 15, the peripheral portion 35 and the surface 11b of the second leg 5b is maintained.

The fastening arrangement 1 with the profiled rail 3 and the fixing elements 14 does not necessarily have to be used to fasten the facing components 33 in the region of the upper and lower peripheral portions 35 of each of these facing components. Fixing may take place by means of one fixing element 14 per profiled rail 3 and per facing component 33 in the region both of an upper and of a lower peripheral portion 35.

Figure 6:
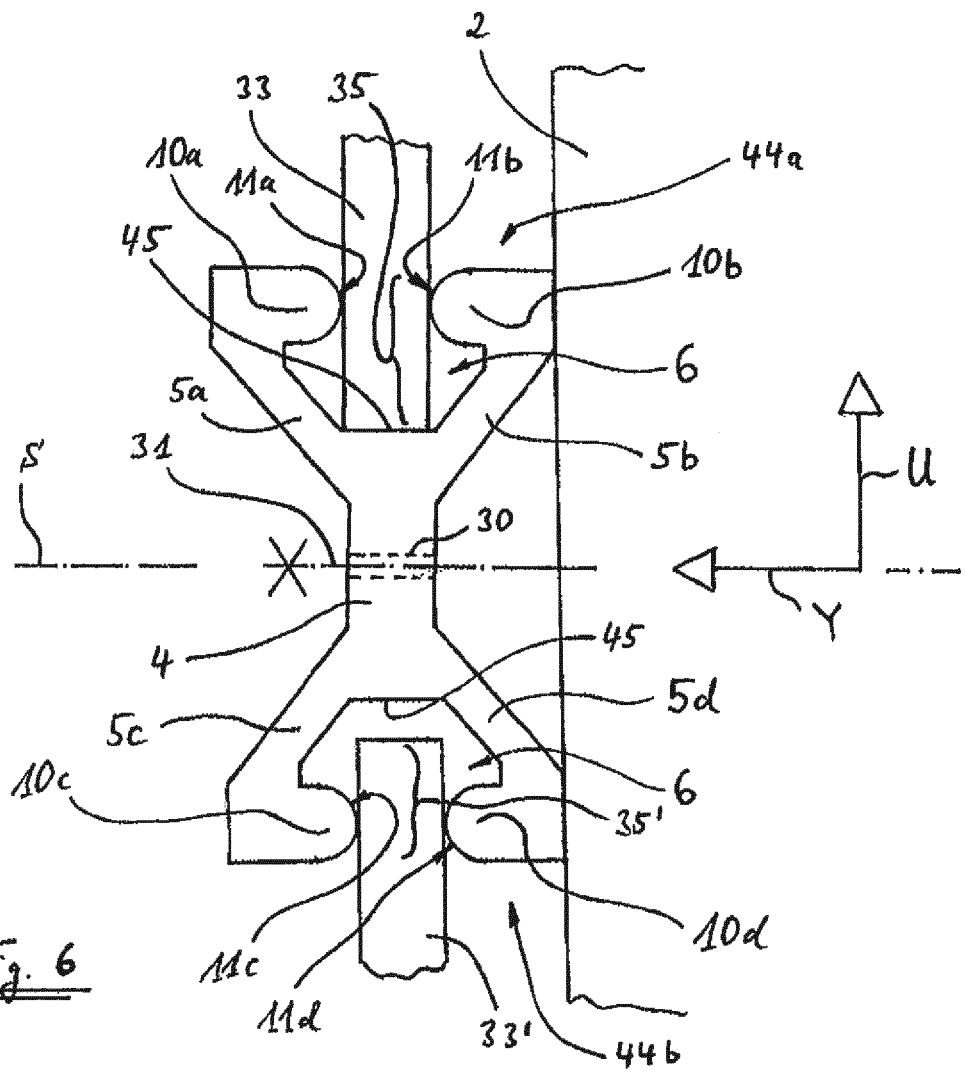
FIG. 6 is a variant of the profiled rail from FIG. 1, viewed along its longitudinal direction, peripheral portions of two plate-shaped facing components also being shown, these being held in intermediate spaces in the profiled rail.

FIG. 6 shows a variant of the profiled rail 3 for forming the fastening arrangement 1. It may be the case that a number of plate-shaped facing components 33, 33' need to be installed adjacent to each other to line the interior of an aircraft cabin in the circumferential direction U of the fuselage. This situation is also illustrated in FIG. 2 by means of a dashed line. In order to make this possible, the profiled rail 3 may also be formed as a double-Y shape, as shown in FIG. 6. The double-Y-shape of the profiled rails 3 means that these comprise two intermediate spaces 6 which are open on two different longitudinal sides 44a and 44b of the profiled rail 3. On the other hand, the Y-shaped profiled rail 3 shown in FIGS. 1 and 4 only comprises one intermediate space 6 which is open on the longitudinal side 44a of the profiled rail 3.

The double-Y shape of the profiled rail 3 may also be designed to be symmetrical with respect to an axis of symmetry S, as shown in FIG. 6. Two further legs 5c and 5d with protruding regions 10c and 10d and surfaces 11c and 11d then also extend from the base region 4 of the profiled rail 3, these being formed in the same way as the legs 5a, 5b which are arranged symmetrically with respect to S towards the other longitudinal side 44a of the profiled rail 3, and their protruding regions 10a, 10b with surfaces 11a, 11b, as described in relation to FIG. 4.

In addition, FIG. 6 shows that a peripheral portion 35' of a plate-shaped facing component 33', which is held in the intermediate space 6 in the region of the longitudinal side 44b of the profiled rail 3, does not necessarily have to stand on a base 45 of the intermediate space 6. In particular, if the facing component 33' is held on an upper peripheral portion 35' with respect to the direction of gravity by means of the intermediate space 6, which opens to the longitudinal side 44b, a gap may arise between the peripheral portion 35' and the base 45.

Figure 7:
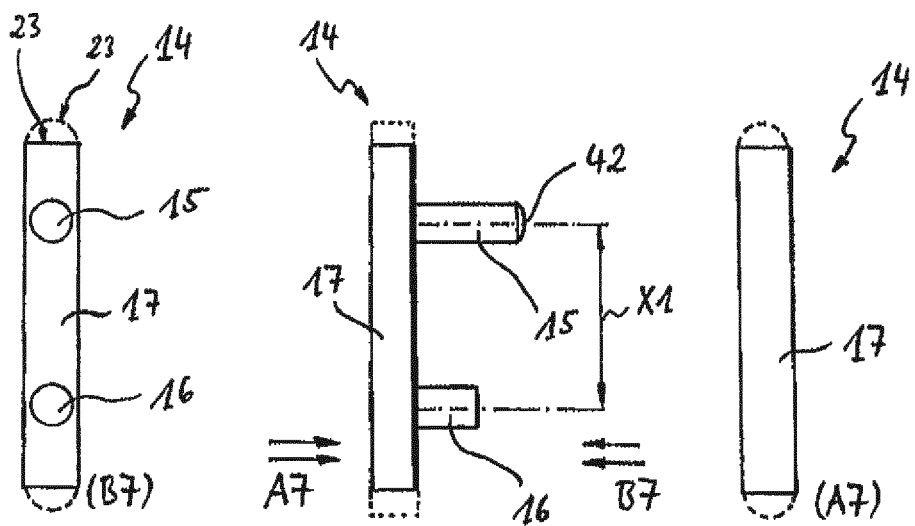
FIG. 7 shows a fixing element for the fastening arrangement in FIG. 1 according to the first embodiment of the invention.

FIGS. 7, 8 and 9 show further embodiments of the fixing element 14 in a view from beneath, a side view and a view from above respectively.

FIG. 7 shows a fixing element 14 with a cuboid base portion 17 which comprises flat side surfaces 23, as described in relation to FIG. 1. FIG. 7 also shows a development of the side surfaces 23 in rounded, sometimes semi-cylindrical form by means of dashed lines. The fixing element 14 in FIG. 7 is provided for fixing by friction alone by jamming the extensions 15 and 16 in the openings 12 in the profiled rail 3.

By way of example, FIG. 8 shows a fixing element 14 with a cuboid base portion 17, comprising a locking element 26 on one end and a further engagement element 46 on an opposite end of the base portion 17. The extensions 15 and 16 may be formed as in the example shown in FIG. 7. In the embodiment shown in FIG. 8 too, the locking element 26 is in the form of an elastic spring-mounted tongue which tapers towards its end and comprises a locking projection, this tongue being set apart from the base portion 17 in the same direction as the extensions 15 and 16. The engagement element 46 is designed as a step in the base portion 17 for engaging behind a correspondingly designed step, for example, on an inner surface of a recess 21. It is evident that a fixing element in which the base portion is designed with rounded side surfaces 23 can be equipped with a locking element 26 and an engagement element 46, even though the base portion 17 in FIG. 8 is shown as being cuboid with substantially flat side surfaces 23. It is also evident that the fixing element 14 may also only comprise either the locking element 26 or the engagement element 46. FIG. 8A is a schematic representation of how the recess 21 in the profiled rail 3 can be designed to lock the fixing element 14 by a positive connection.

FIG. 9 shows a fixing element 14 for use in a fastening arrangement 1 according to a further embodiment of the invention. The fixing element 14 shown in FIG. 9 comprises a flatter base portion 17 than the fixing elements 14 described in the paragraphs above. The fixing element 14 shown in FIG. 9 is provided with bevels 47 in the region of the end portions of the base portion 17. The extensions 15 and 16 of the fixing element 14 shown in FIG. 9 are in turn formed in a similar way to that described above, the extension 15 being designed to be longer than the extension 16 which extends substantially parallel to the extension 15. The extension 16 is also provided with a tapering end 50 in this embodiment of the invention to make it easier to insert into the associated opening 12.

FIG. 10 shows one end 13 of a profiled rail 3 in which the fixing element 14 shown in FIG. 9 is used advantageously. The text below merely indicates the differences in the profiled rail 3 shown in FIG. 10 which distinguish this from the profiled rail 3 shown in FIG. 1.

In the case of the profiled rail 3 in FIG. 10, adjacent openings 12 formed in the region of the illustrated end 13 are once again preferably cylindrical and extend substantially parallel to one another in a protruding region 10a of a first leg 5a. In the case of FIG. 10, however, a recess 21 is not provided to hold the base portion 17 of the fixing element 14, but instead the openings 12 extend from the outside 20 of the first leg 5a through this first leg to the intermediate space 6. In particular, a profiled rail 3 of this type can be produced in a simpler and more cost-effective manner, as pieces of the length required for the profiled rail 3 merely need to be cut for this purpose from one extruded length or extruded bulk stock. The recess 21 does not need to be produced. Instead, the openings 12 merely need to be produced in the first leg 5a, by drilling for example.

The extensions 15 and 16 of the fixing element 14 shown in FIG. 9 are pressed into the adjacent openings 12 and are jammed in these openings by friction in order to fix a plate-shaped facing component 33 by means of the profiled rail 3 shown in FIG. 10. The extension 15 protrudes into the intermediate space 6, as already described in relation to FIG. 3, and exerts a compressive force at this point on a peripheral portion 35 of the plate-shaped facing component 33 (not illustrated in FIG. 10) which is held in the intermediate space 6. However, the base portion 17 is not flush with the outside 20 of the profiled rail 3 in the embodiment shown in FIG. 9 when the extensions 15 and 16 are fully pressed in, but lies on top of this. Nevertheless, the flat configuration of the base portion 17 and the bevels 47 create a visually appealing appearance of the profiled rail 3 with the fixing element 14 which is installed to fix the facing component 33.

The profiled rails 3 and the fixing elements 14 of the embodiments described above may be produced from a suitable plastics material, and the profiled rails 3 can be produced by extruding and subsequently machining.

Although the present invention has been fully described above by means of preferred embodiments, it is not limited to the above, but may be modified in multiple ways.

For example, the profiled rail could also be designed to secure the peripheral portion of each of the adjacent facing components held in the intermediate space not only by means of one fixing element, but also by a number of fixing elements, for example two, so as to prevent slipping.

Even though it is very advantageous, as described above, if the profiled rails 3 are fastened to adjacent structural components such as formers, at a constant height, without forming a continuous upper and lower rail, it is also conceivable to make use of friction-based fixing by means of the principle explained above, using fixing elements with a continuous upper and/or lower rail.

The present invention relates to a fastening arrangement for plate-shaped facing components. The fastening arrangement comprises at least one profiled rail comprising legs in a cross-section, an intermediate space being formed between these legs and configured to hold a peripheral portion of at least one of the facing components. A first one of the legs of the profiled rail comprises at least one opening which extends into the first leg in a transverse direction of the profiled rail. The fastening arrangement also comprises at least one fixing element which is equipped with at least one extension. The extension is designed such that it can be pressed into the opening in the first leg to fix the facing component such that the extension protrudes into the intermediate space and portions thereof come into frictional contact with the peripheral portion of the facing component held in the intermediate space.

The invention also relates to a facing arrangement comprising two or more plate-shaped facing components which are arranged such that they lie next to one another at joints to form a facing in an aircraft or spacecraft, and comprising at least one such fastening arrangement. The invention also proposes an aircraft or spacecraft, in particular an aircraft, with such a facing arrangement.

What is claimed is:

1. A fastening arrangement for plate-shaped facing components, with at least one profiled rail, which comprises legs in a cross-section, between which an intermediate space is formed to hold a peripheral portion of at least one of the facing components, and
    with at least one fixing element,
    a first one of the legs comprising at least one opening which extends into the first leg in a transverse direction of the profiled rail,
    wherein the fixing element is equipped with at least one extension configured to be pressed into the opening in the first leg for fixing the facing component so the extension protrudes into the intermediate space and portions thereof come into frictional contact with the peripheral portion of the facing component held in the intermediate space, wherein the at least one profiled rail comprises an outer surface, and the fastening arrangement is configured such that, after the extension is pressed into the opening, the fixing element is flush with the outer surface of the at least one profiled rail.

2. The fastening arrangement according to claim 1, wherein the first leg comprises at least two adjacent openings and the fixing element comprises at least two extensions, the adjacent openings and the extensions being formed and arranged such that at least one of the extensions of the fixing element protrudes into the intermediate space after the extensions have been pressed into the adjacent openings in the first leg.

3. The fastening arrangement according to claim 2, wherein the adjacent openings in the first leg and the extensions of the fixing element are formed and arranged such that the extensions are jammed by friction in the openings when pressed into these openings and the fixing element is thus fixed to the first leg.

4. The fastening arrangement according to claim 3, wherein a gap between the adjacent openings in the first leg and a gap between the extensions of the fixing element differ by a sufficient amount to ensure that the extensions are jammed in position.

5. The fastening arrangement according to claim 2, wherein one of the two extensions of the fixing element is designed such that it does not protrude into the intermediate space after the extensions are pressed into the adjacent openings.

6. The fastening arrangement according to claim 2, wherein the adjacent openings in the first leg run substantially parallel to each other and the extensions extend substantially parallel to each other from a base portion of the fixing element.

7. The fastening arrangement according to claim 1, wherein an end face of the extension which protrudes into the intermediate space after pressing in, this end face being able to be brought into frictional contact with the peripheral portion, is provided with a friction-enhancing material comprising a coating, or with a friction-enhancing surface structure comprising grooves or a napped surface, to increase the friction between the end face of the extension and the peripheral portion.

8. The fastening arrangement according to claim 1, wherein a second one of the legs on a surface facing the first leg, pointing towards the intermediate space, is provided with a friction-enhancing material comprising a coating, or with a friction-enhancing surface structure comprising grooves or a napped surface, to increase the friction between the surface of the second leg and the peripheral portion.

9. The fastening arrangement according to claim 1, wherein the extension or extensions is/are designed as a substantially cylindrical pin or as substantially cylindrical pins or the opening or the openings in the first leg is/are substantially cylindrical in form.

10. The fastening arrangement according to claim 1, wherein the fixing element comprises an engagement element or a locking element by which the fixing element can be fixed by a positive connection on the profiled rail after pressing the extension or the extensions into the opening or the openings in the first leg by engaging the engagement element or locking the locking element in a notch or undercut in the profiled rail.

11. The fastening arrangement according to claim 1, wherein the cross-section of the profiled rail is Y-shaped with an intermediate space which is open on one longitudinal side of the profiled rail or double-Y-shaped with two intermediate spaces which are open on two different longitudinal sides of the profiled rail.

12. A facing arrangement, with two or more plate-shaped facing components, which are arranged such that they lie next to one another at at least one joint to form a facing in an aircraft or spacecraft, and
    with at least one fastening arrangement according to claim 1,
    the profiled rail of the fastening arrangement being fastened to a structural component of the aircraft or spacecraft, and
    peripheral portions of two adjacent facing components being held in the intermediate space of the profiled rail of the fastening arrangement in the region of the joint and at least one of the held peripheral portions being fixed by friction in the intermediate space of the profiled rail by the fixing element of the fastening arrangement to prevent slipping.

13. The facing arrangement according to claim 12, wherein at least two fixing elements per profiled rail of the fastening arrangement are provided and the peripheral portions of the two adjacent facing components held in the intermediate space are each fixed by friction in the intermediate space by the two fixing elements to prevent slipping.

14. The facing arrangement according to claim 12, wherein a fastening arrangement with at least two profiled rails is provided in the region of each joint between two facing components, the facing components being held on opposite edges of the said rails in the region of the joint by the two profiled rails.

15. An aircraft or spacecraft with a facing arrangement according to claim 12.

16. The fastening arrangement according to claim 1, wherein an end face of the extension which protrudes into the intermediate space after pressing in, this end face being able to be brought into frictional contact with the peripheral portion, is provided with a friction-enhancing material comprising a coating, and with a friction-enhancing surface structure comprising grooves or a napped surface, to increase the friction between the end face of the extension and the peripheral portion.

17. The fastening arrangement according to claim 1, wherein a second one of the legs on a surface facing the first leg, pointing towards the intermediate space, is provided with a friction-enhancing material comprising a coating, and with a friction-enhancing surface structure comprising grooves or a napped surface, to increase the friction between the surface of the second leg and the peripheral portion.

18. The fastening arrangement according to claim 1, wherein the extension or extensions is/are designed as a substantially cylindrical pin or as substantially cylindrical pins and the opening or the openings in the first leg is/are substantially cylindrical in form.

19. The fastening arrangement according to claim 1, wherein the fixing element comprises an engagement element and a locking element by which the fixing element can be fixed by a positive connection on the profiled rail after pressing the extension or the extensions into the opening or the openings in the first leg by engaging the engagement element and locking the locking element in a notch or undercut in the profiled rail.

\* \* \* \* \*